United States Patent Office 3,150,703
Patented Sept. 29, 1964

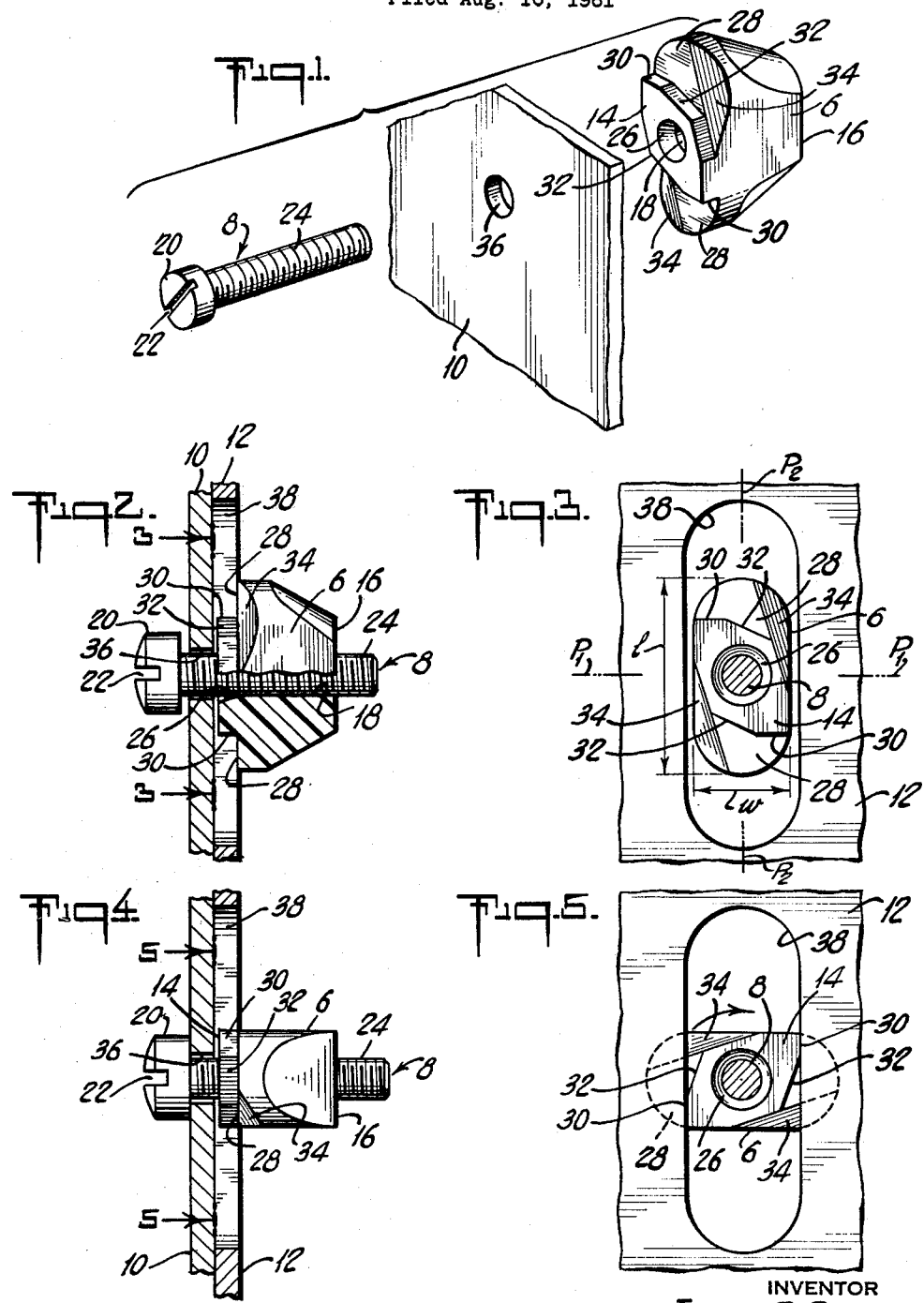

3,150,703
FASTENING DEVICE
Joseph R. Preziosi, Newark, N.J., assignor to Elastic Stop Nut Corporation of America, Union, N.J., a corporation of New Jersey
Filed Aug. 16, 1961, Ser. No. 131,900
8 Claims. (Cl. 151—7)

This invention relates to fastening devices and more particularly to nuts and still more particularly to a nut of thread impressionable elastic material and which is useful as a component of a quick release fastener.

Many quick release fasteners have been proposed. One of the more recent ones (which in the context of the present invention is typical of many prior quick release fasteners) involves not only a nut but also a retainer for the nut. The retainer is complex and costly to manufacture, stock, handle and install, the latter entailing an expensive welding or riveting operation.

A nut according to the present invention is of simple design, is readily and inexpensively made and is readily used. It is strong and completely eliminates the need for and the cost of a retainer. The only part required, in addition to the nut, is an externally threaded member, such as an ordinary bolt. The workpieces which are to be fastened together are apertured, and the aperture through one of the workpieces is elongated. A nut according to the invention will not mar or otherwise damage workpieces with which it is used.

Furthermore, a nut according to the invention may be used with a bolt of any of a plurality of thread sizes. For example, it has been found that a nut suitable for use with a 6–32 bolt is equally useful with a 6–40 bolt.

A nut according to the present invention broadly comprises a body of thread impressionable elastic material having a bore adapted to conform to and frictionally engage an external thread of an externally threaded member, the nut also having a non-circular work clamping surface and a pair of stops adapted to engage the wall of the elongated workpiece aperture to limit rotation of the nut with respect to that aperture.

Advantageously, a nut according to the present invention is a one-piece molding of thermoplastic material. One thermoplastic material of which completely satisfactory nuts according to the invention have been molded is nylon. Molds for use in making such nuts are inexpensive, readily made and easily used.

Important objects of the invention are to provide a nut having the above advantages.

The above and other objects and advantages will appear from the following description of a preferred example of the invention and the accompanying drawings of such example, wherein:

FIG. 1 is an exploded perspective view showing a nut according to the invention, a first or outer workpiece or panel and a bolt, prior to assembly of these parts with each other;

FIG. 2 is a view showing the parts of FIG. 1 assembled with each other, the nut being shown in fragmentary axial section, and also showing a second or inner workpiece or panel positioned to be locked to the first workpiece by the nut and the bolt;

FIG. 3 is a view on line 3—3 of FIG. 2;

FIG. 4 is a view similar to FIG. 2 but showing the parts in the fully joined position; and FIG. 5 is a view on line 5—5 of FIG. 4.

The drawings show a nut 6 and an externally threaded member which as illustrated is in the form of a bolt 8. Nut 6 and bolt 8 cooperate to join a first or outer workpiece or panel 10 (FIGS. 1, 2 and 4) and a second or inner workpiece or panel 12 (FIGS. 2, 3, 4 and 5).

Nut 6 comprises a body of thread impressionable elastic material having a first end 14 and a second end 16 and a bore 18 defining a nut axis. Bore 18 is in open communication with at least first nut end 14, and, as shown, bore 18 is also in open communication with second nut end 16.

There need be nothing special about bolt 8 which as shown includes a head 20 having a screw driver slot 22 (to facilitate rotation of bolt 8) and an externally threaded shank 24.

Bore 18 is adapted to receive, from first nut end 14, and to conform to and frictionally to engage the external screw thread of bolt shank 24. To facilitate the insertion of shank 24 into bore 18, the end of bore 18 adjacent first nut end 14 is countersunk as shown at 26 (FIG. 2).

Nut 6 also has a plane, non-circular work clamping surface 28 perpendicular to the nut axis and facing away from second nut end 16 and axially spaced a predetermined distance toward second nut end 16 from first nut end 14, this predetermined distance being not greater, and as shown, less than the thickness of panel 12. Work clamping surface 28 has a predetermined width $w$ (which may be deemed the width of nut 6) in a first axial plane $P_1$—$P_1$ (FIG. 3) and a predetermined length $l$ (which may be deemed the length of nut 6) in a second axial plane $P_2$—$P_2$ (FIG. 3) perpendicular to plane $P_1$—$P_1$. As shown in FIG. 3, length $l$ is greater than width $w$.

Nut 6 also has a pair of stops, which as shown are in the form of stop surfaces 30, axially between work clamping surface 28 and first nut end 14. The purpose of stop surfaces 30 will be brought out.

Stop surfaces 30 are on opposite sides of and face away from and are at least substantially parallel to and are equidistant from plane $P_1$—$P_1$. Furthermore, each stop surface 30 is spaced from plane $P_1$—$P_1$ a predetermined distance which is greater than half of width $w$ and less than half of length $l$.

Furthermore, stop surfaces 30 are entirely on opposite sides of plane $P_2$—$P_2$, and all parts of nut 6 which are axially between work clamping surface 28 and first nut end 14 and which are on the opposite side of plane $P_2$—$P_2$ from each stop surface 30 are closer to the nut axis than the predetermined distance between each stop surface 30 and plane $P_1$—$P_1$. To that end, nut 6 is provided with a relief surface 32 extending from the edge of each stop surface 30 adjacent plane $P_2$—$P_2$ across that plane. All parts of each relief surface 32 on the opposite side of plane $P_2$—$P_2$ from stop surface 30 to which it is joined are closer to the nut axis than the predetermined distance referred to in this paragraph.

As shown, nut 6 also has a pair of cam surfaces 34 which intersect work clamping surface 28. The purpose of cam surfaces 34 will be brought out.

Outer panel 10 has a circular aperture 36 (FIGS. 1, 2 and 4) therethrough and inner panel 12 has an elongated aperture 38 (FIGS. 2, 3, 4 and 5) therethrough. Aperture 36 is large enough freely to receive bolt shank 24 and functions as a bolt clearance hole but is too small for nut 6 to pass therethrough.

Aperture 38 has a length which is greater than length $l$ of work clamping surface 28 of nut 6 and a width which is both greater than width $w$ of work clamping surface 28 and less than length $l$ of work clamping surface 28. More specifically, the width of aperture 38 is substantially equal to twice the predetermined distance between each stop surface 30 and plane $P_1$—$P_1$. Thus, nut 6 can pass through aperture 38 only when plane $P_2$—$P_2$ is substantially aligned with the long dimension of aperture 38.

As the first step in joining panels 10 and 12 together, panel 10, nut 6 and bolt 8 are assembled (after having first been relatively positioned as shown in FIG. 1), with bolt shank 24 passing through aperture 36 and bolt head 20 on that side of panel 10 which is to be remote from panel 12. Shank 24 then enters nut bore 18 from first nut end 14 and nut 6 is screwed onto shank 24 until first nut end 14 is spaced from bolt head 20 a distance less than the combined thickness of panels 10 and 12 and work clamping surface 28 is spaced from bolt head 20 a distance greater than the combined thickness of panels 10 and 12. These dimensional relationships can be seen in FIG. 2. Nut bore 18 has a thread impressed therein by the bolt shank 24. The impressed thread frictionally engages and conforms to the thread of bolt shank 24 to create a prevailing torque type of engagement between bolt 8 and nut 6.

Next, panel 12 is brought into position with aperture 38 aligned with aperture 36, and bolt 8 is rotated until nut 6 is oriented with plane $P_2$—$P_2$ aligned with the long dimension of aperture 38. Panel 12 is then abutted against panel 10, and the parts are as shown in FIGS. 2 and 3.

Further rotation of bolt 8 (in the direction of the arrow in FIG. 5) then causes nut 6 to rotate substantially 90° until stop surfaces 30 engage the side walls of aperture 38. Relief surfaces 32, by virtue of the heretofore described dimensional features thereof, do not interfere with this rotation.

The engagement of stop surfaces 30 and the side walls of aperture 38 serves the functions of preventing further rotation of nut 6 and allowing relative advancement of bolt 8 with respect to nut 6 to create a clamp-up of panels 10 and 12 between work clamping surface 28 and bolt head 20. Thus is the joining of panels 10 and 12 completed, and the parts are as shown in FIGS. 4 and 5.

Prior to the engagement of stop surfaces 30 and the wall of aperture 38, nut 6 and bolt 8 rotated as a unit, due to the prevailing torque type of engagement of nut 6 and bolt 8.

To release the connection of panels 10 and 12, it is necessary merely to turn bolt 8 in the direction opposite that of the arrow in FIG. 5. Nut 6 and bolt 8 once again turn as a unit until nut 6 is again oriented with plane $P_2$—$P_2$ aligned with the long dimension of aperture 38. At this point the connection is released, again with a total bolt rotation of about 90°.

If it is then desired to rejoin panels 10 and 12, it is necessary merely to reorient the parts as shown in FIGS. 2 and 3 and again rotate bolt 8 about 90° in the direction of the arrow in FIG. 5. At the start of the rejoining operation, however, nut 6 will be closer to bolt head 20 than shown in FIG. 2. More specifically, work clamping surface 28 will be spaced from bolt head 20 a distance substantially equal to the combined thickness of panels 10 and 12. In this instance, cam surfaces 34 may engage the side walls of aperture 38 to draw nut 6 through aperture 38.

As shown, nut 6 is of one piece. As previously indicated, it is easily molded of a thermoplastic material, and completely satisfactory nut according to the invention have been molded of nylon (a thermoplastic material).

Nut bore 18 is preferably unthreaded initially. If nut 6 is screwed onto bolt 8 and then removed therefrom, bore 18 might be found to retain partially the thread impressed therein by bolt 8. This partially retained thread would, however, be such that if nut 6 is reassembled with bolt 8, bore 18 would once again have the complete impressed thread impressed therein frictionally to engage the bolt thread in the prevailing torque type of engagement.

The invention is well adapted to the attainment of the stated objects and advantages and others.

The details of the disclosed example of the invention are to be taken as illustrative only and not as limitations upon the invention, except as those details may be included in the appended claims.

What is claimed is:

1. A nut comprising a body of thread impressionable non-metallic elastic material having first and second ends, a bore defining a nut axis and in open communication with at least said first end and adapted to conform to and frictionally engage an external thread of an externally threaded member, said nut also having a non-circular work clamping surface facing away from said second end and axially spaced from said first end, said nut also having a pair of stops axially between said work clamping surface and said first end and adapted to engage the walls of an elongated aperture in a workpiece to limit rotation of said nut with respect to said aperture, and said nut also having a pair of cam surfaces intersecting said work clamping surface and adapted to engage the wall of said aperture to draw said nut through said aperture.

2. The invention set forth in claim 1 wherein said nut is one-piece.

3. The invention set forth in claim 1 wherein said bore is in open communication with said second end.

4. The invention set forth in claim 1 wherein said material is thermoplastic.

5. The invention set forth in claim 1 wherein said material is nylon.

6. The invention set forth in claim 1 wherein said bore is threadless.

7. The invention set forth in claim 1 wherein said bore is threaded.

8. A molded one-piece nut comprising a body of thread impressionable elastic thermoplastic material having first and second ends, a bore defining a nut axis and in open communication with at least said first end and adapted to conform to and frictionally engage an external thread of an externally threaded member, said nut also having a work clamping surface facing away from said second end and axially spaced from said first end and having a predetermined width in a first axial plane and a predetermined length greater than said width in a second axial plane perpendicular to said first plane, said nut also having a pair of stop surfaces axially between said work clamping surface and said first end, said stop surfaces on opposite sides of and facing away from and at least substantially parallel to and equidistant from said first plane, each said stop surface spaced from said first plane a predetermined distance greater than half said width and less than half said length, said stop surfaces also being entirely on opposite sides of said second plane, all parts of said nut axially between said work clamping surface and said first end and on the opposite side of said second plane from each said stop surface being closer to said axis than said predetermined distance, said stop surfaces adapted to engage the walls of an elongated aperture in a workpiece to limit rotation of said nut with respect to said aperture, and said nut also having a pair of cam surfaces intersecting said work clamping surface and adapted to engage the wall of said aperture to draw said nut through said aperture.

References Cited in the file of this patent

UNITED STATES PATENTS

| | | |
|---|---|---|
| 1,820,667 | Leyes | Aug. 25, 1931 |
| 2,809,726 | Farguher et al. | Oct. 15, 1957 |
| 2,908,309 | Brill | Oct. 13, 1959 |
| 2,936,501 | Koch | May 17, 1960 |